United States Patent
Tanabe (10) Patent No.: US 11,442,217 B2
(45) Date of Patent: Sep. 13, 2022

(54) BACKLIGHT HAVING LIGHT GUIDE PLATE WITH SIDE SURFACE WITH INCLINATION ANGLE AND IMAGE DISPLAY DEVICE

(71) Applicant: Funai Electric Co., Ltd., Osaka (JP)

(72) Inventor: Noritaka Tanabe, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/194,784

(22) Filed: Mar. 8, 2021

(65) Prior Publication Data
US 2021/0333463 A1    Oct. 28, 2021

(30) Foreign Application Priority Data
Apr. 27, 2020   (JP) ................ JP2020-078631

(51) Int. Cl.
  *F21V 8/00*   (2006.01)
  *G02F 1/1333*  (2006.01)
  (Continued)

(52) U.S. Cl.
  CPC .......... *G02B 6/0045* (2013.01); *G02B 6/0043* (2013.01); *G02B 6/0055* (2013.01);
  (Continued)

(58) Field of Classification Search
  CPC .......... G02B 6/0045; G02F 1/133314; G02F 1/133317; G02F 1/133615
  See application file for complete search history.

(56) References Cited

U.S. PATENT DOCUMENTS

2006/0146573 A1*  7/2006  Iwauchi .......... G02B 6/003
                                                      362/621
2011/0085332 A1*  4/2011  Vissenberg ...... G02B 6/0011
                                                      362/235
(Continued)

FOREIGN PATENT DOCUMENTS

EP     1 209 410 A1    5/2002
EP     1 574 780 A1    9/2005
(Continued)

OTHER PUBLICATIONS

The extended European search report for the corresponding European application No. 21166439.6, dated Jun. 30, 2021.

*Primary Examiner* — Keith G. Delahoussaye
(74) *Attorney, Agent, or Firm* — Global IP Counselors, LLP (57) ABSTRACT

A backlight comprises a light guide plate and a light emitting element. The light guide plate has a first main surface, a second main surface opposite the first main surface, and a side surface connecting the first main surface and the second main surface, the side surface having a first region and a second region different from the first region. The light emitting element emits light toward the first region of the side surface of the light guide plate. The side surface of the light guide plate includes, in the second region of the side surface of the light guide plate, a first inclined surface that extends from an outer edge of the first main surface in an inclined manner and has an inclination angle between 52° and 83° with respect to the first main surface.

19 Claims, 8 Drawing Sheets

(51) Int. Cl.
*G02F 1/13357* (2006.01)
*H04N 5/64* (2006.01)
*G02F 1/1335* (2006.01)

(52) U.S. Cl.
CPC ..... *G02B 6/0088* (2013.01); *G02F 1/133317* (2021.01); *G02F 1/133615* (2013.01); *G02F 1/133524* (2013.01); *H04N 5/64* (2013.01)

(56) References Cited

U.S. PATENT DOCUMENTS

| | | | |
|---|---|---|---|
| 2014/0376258 A1 | 12/2014 | Wu et al. | |
| 2015/0226907 A1* | 8/2015 | Hu | G02B 6/002 362/612 |
| 2016/0085014 A1* | 3/2016 | Katsumata | G02B 6/0016 362/613 |
| 2016/0223739 A1* | 8/2016 | Yoon | G02B 6/0031 |
| 2018/0231709 A1* | 8/2018 | Chen | G02F 1/133615 |

FOREIGN PATENT DOCUMENTS

| | | | | |
|---|---|---|---|---|
| EP | 2523024 A1 * | 11/2012 | | G02B 6/0031 |
| JP | 2006-294361 A | 10/2006 | | |

\* cited by examiner

BACKLIGHT HAVING LIGHT GUIDE PLATE WITH SIDE SURFACE WITH INCLINATION ANGLE AND IMAGE DISPLAY DEVICE

CROSS-REFERENCE TO RELATED APPLICATIONS

This application claims priority to Japanese Patent Application No. 2020-078631 filed on Apr. 27, 2020. The entire disclosure of Japanese Patent Application No. 2020-078631 is hereby incorporated herein by reference.

BACKGROUND

Field of the Invention

The present invention generally relates to a backlight and an image display device. More specifically, the present invention relates to a backlight and an image display device for displaying image.

Background Information

Generally, an edge-lit type backlight is provided to an image display device to illuminate a back surface of a display panel. This type of backlight includes a rectangular-shaped light guide plate disposed opposite to the back surface of the display panel, a plurality of LEDs (Light Emitting Diodes) that emit light toward a light-incident-side side surface of the light guide plate, an optical sheet arranged to cover a first main surface (a surface on the display panel side) of the light guide plate, and a reflective sheet arranged to cover a second main surface of the light guide plate opposite the first main surface.

In the backlight described above, the luminance of the first main surface of the light guide plate in the vicinity of an opposite side surface opposite the light incident side (a side surface on a side opposite the light-incident-side side surface) tends to decrease. For this reason, Japanese Patent Application Publication No. 2006-294361 (hereinafter "Patent Literature 1"), for example, proposes a technology to suppress the decrease in luminance on the opposite side surface opposite the light incident side of the light guide plate by attaching a reflective member to the opposite side surface opposite the light incident side of the light guide plate.

SUMMARY

However, the technology disclosed in Patent Literature 1 above does not sufficiently suppress the decrease in luminance of the light guide plate in the vicinity of the opposite side surface opposite the light incident side due to variations in the mounting accuracy of the reflective member. This results in occurrence of uneven luminance on the display panel.

One object of the present disclosure is to provide a backlight and an image display device that can suppress uneven luminance on a light guide plate or a display panel.

In view of the state of the known technology and in accordance with a first aspect of the present invention, a backlight comprises a light guide plate and a light emitting element. The light guide plate has a first main surface, a second main surface opposite the first main surface, and a side surface connecting the first main surface and the second main surface, the side surface having a first region and a second region different from the first region. The light emitting element emits light toward the first region of the side surface of the light guide plate. The side surface of the light guide plate includes, in the second region of the side surface of the light guide plate, a first inclined surface that extends from an outer edge of the first main surface in an inclined manner and has an inclination angle between 52° and 83° with respect to the first main surface.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments about figures, shapes, materials, components, and positions and connection forms of the components are provided for illustration only and not for the purpose of limiting the invention as defined by the appended claims and their equivalents. The components in the embodiments that are not described in independent claims are described as optional components.

First Embodiment

1-1. Configuration of Image Display Device

Figure 1:
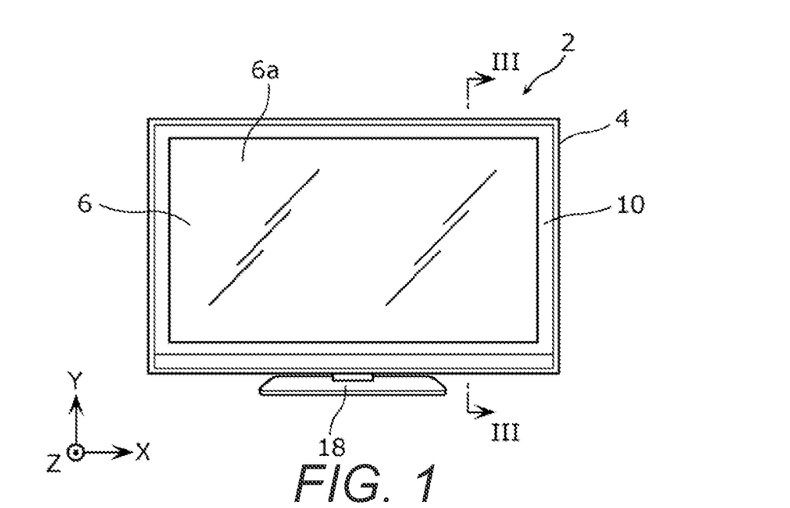
FIG. 1 is a front elevational view of an exterior of an image display device according to a first embodiment.
Figure 2:
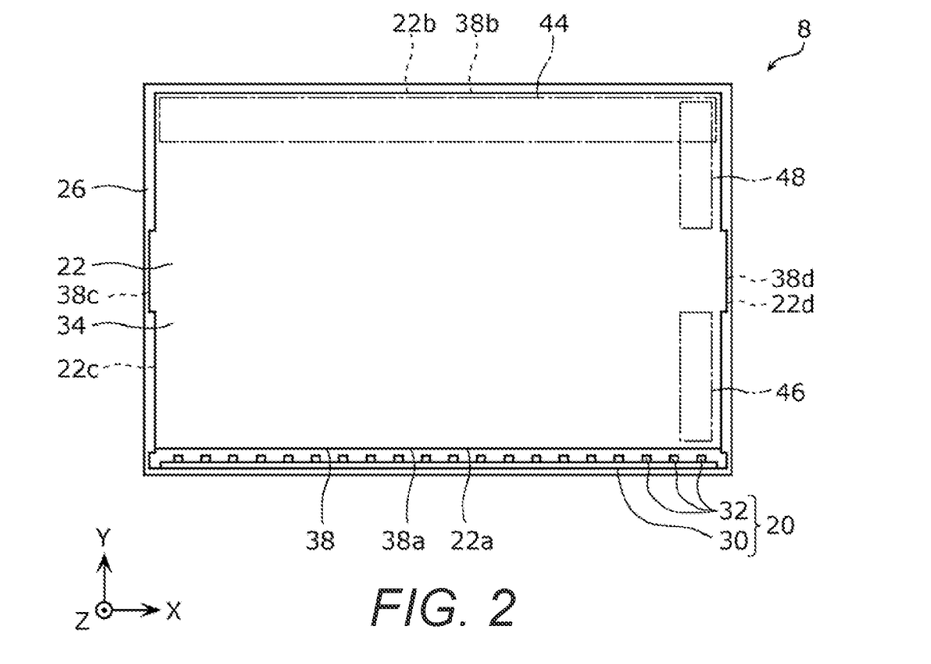
FIG. 2 is a front elevational view of a backlight of the image display device according to the first embodiment.
Figure 3:
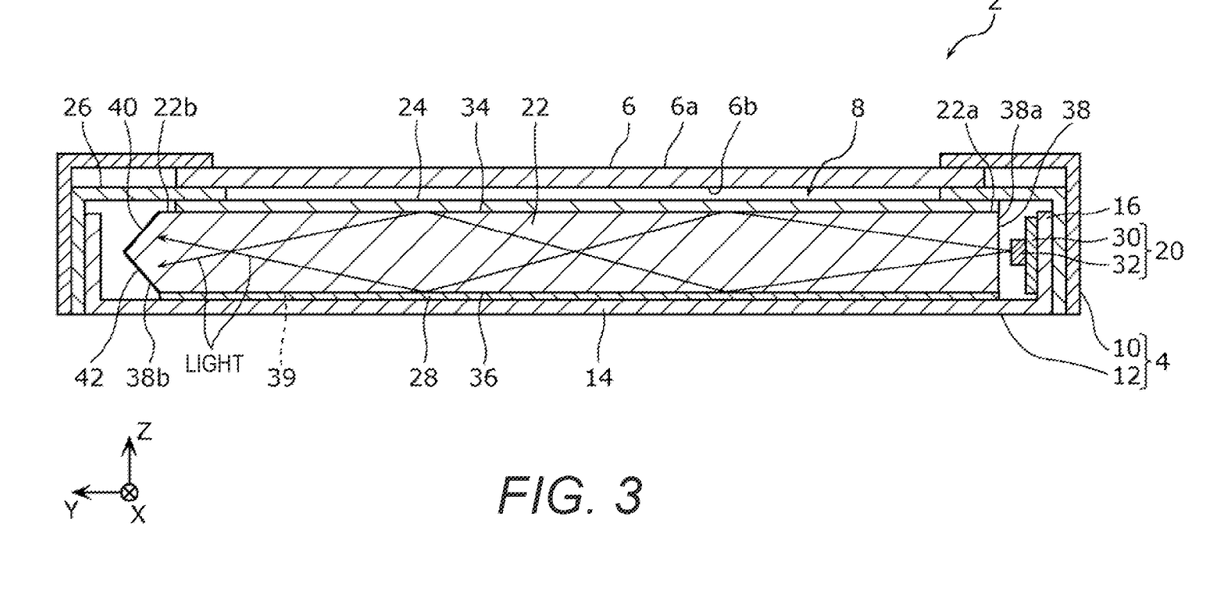
FIG. 3 is a cross-sectional view of the image display device according to the first embodiment, taken along line of FIG. 1.
Figure 4:
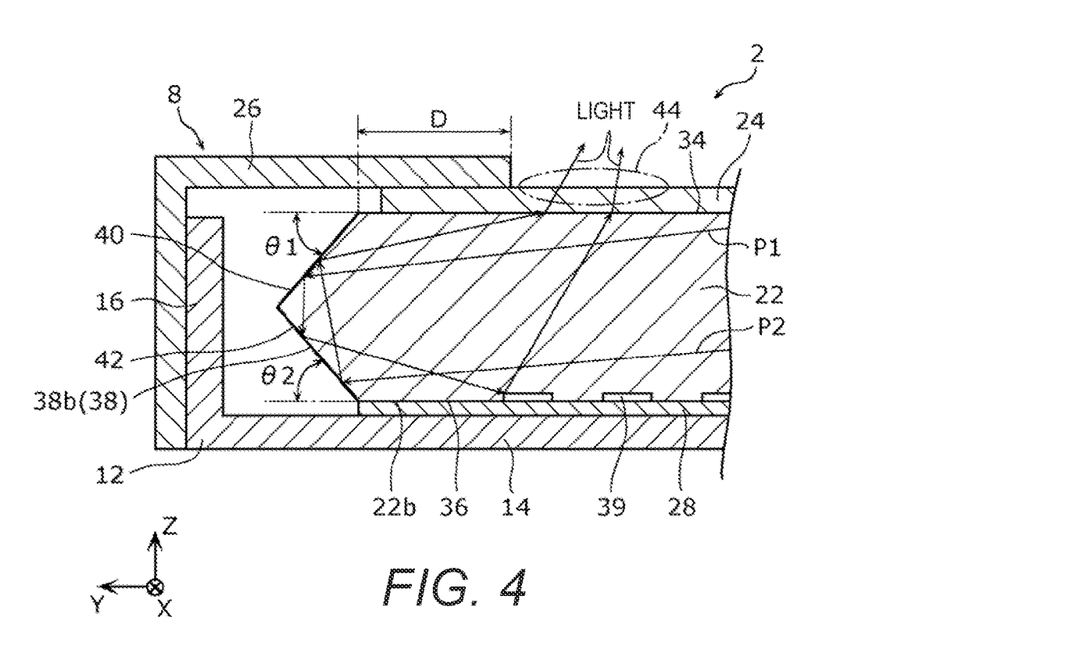
FIG. 4 is an enlarged cross-sectional view of the image display device according to the first embodiment, showing a portion of FIG. 3.

First, referring to FIGS. 1 to 4, the configuration of an image display device 2 according to a first embodiment will be described. FIG. 1 is a front elevational view of an exterior of the image display device 2 according to the first embodiment. FIG. 2 is a front elevational view of a backlight 8 of the image display device 2 according to the first embodiment. FIG. 3 is a cross-sectional view of the image display device 2 according to the first embodiment, taken along line of FIG. 1. FIG. 4 is an enlarged cross-sectional view of the image display device 2 according to the first embodiment, showing a portion of FIG. 3.

In FIGS. 1 to 4, the width direction (left-right direction) of the image display device 2 is referred to as an X-axis direction, the height direction (up-down direction) of the image display device 2 is referred to as a Y-axis direction, and the depth direction (front-back direction) of the image display device 2 is referred to as a Z-axis direction.

As shown in FIG. 1, the image display device 2 is, for example, a liquid crystal display television receiver. As shown in FIGS. 1 to 3, the image display device 2 includes a housing 4, a display panel 6, and the backlight 8. The image display device 2 can also include other conventional components, such as a tuner and other electric circuitry, as understood in the field of the image display device. However, the detailed description of these components will be omitted for the sake of brevity.

As shown in FIG. 1, the housing 4 is configured by assembling a front cabinet 10 and a rear frame 12 to each other. As shown in FIGS. 1 and 3, the front cabinet 10 is formed as a rectangular frame in an XY plane view (i.e., as viewed in the front-back direction or the Z-axis direction). The front cabinet 10 is arranged to cover an outer periphery of the display panel 6. The front cabinet 10 is made of resin, for example. As shown in FIG. 3, the rear frame 12 is formed in a rectangular thin plate or box shape in the XY plane view, for example. The rear frame 12 is arranged to cover the back surface 6b side of the display panel 6. The rear frame 12 has a flat base portion 14 and a side wall 16 extending vertically from an outer periphery of the base portion 14 toward the display panel 6 side. The rear frame 12 is made of a metal with high thermal conductivity, such as aluminum, for example. As shown in FIG. 1, the housing 4 is supported from below by a stand 18.

As shown in FIG. 1, the display panel 6 is a liquid crystal cell formed in a rectangular shape in the XY plane view. An image is displayed on a front surface 6a of the display panel 6. As shown in FIG. 3, the outer periphery of the display panel 6 is supported by the mold frame 26 of the backlight 8 (to be described later).

The backlight 8 is an edge-type or edge-lit-type backlight for emitting light toward the back surface 6b of the display panel 6. As shown in FIG. 3, the backlight 8 is located inside the housing 4 between the display panel 6 and the rear frame 12. As shown in FIGS. 2 to 4, the backlight 8 has an LED bar 20 and a light guide plate 22. In the illustrated embodiment, the backlight 8 also has an optical sheet 24, a mold frame 26 (an example of a frame member), and a reflective sheet 28. For convenience of explanation, the optical sheet 24 is omitted in FIG. 2, and the display panel 6 and front cabinet 10 are omitted in FIG. 4.

As shown in FIGS. 2 and 3, the LED bar 20 has a wiring or circuit board 30 and a plurality of LEDs 32 (an example of light emitting elements). The wiring board 30 is configured in the form of a long board. The wiring board 30 is attached to the side wall 16 of the rear frame 12 by means of thermally conductive double-sided tape (not shown), and is disposed along a lower edge 22a of the light guide plate 22. The wiring board 30 is made of a metal with high thermal conductivity, such as aluminum, for example. The plurality of LEDs 32 are mounted on the wiring board 30. The plurality of LEDs 32 are mounted in a row and spaced apart along a longitudinal direction (i.e., the X-axis direction) of the wiring board 30. Each of the plurality of LEDs 32 is a chip-type LED, for example, and emits light toward a light-incident-side side surface 38a of the light guide plate 22 (described below). In the illustrated embodiment, the plurality of LEDs 32 are arranged relative to each other along the first region of the side surface 38 of the light guide plate 22.

The light guide plate 22 has an overall rectangular shape. Specifically, in the illustrated embodiment, the light guide plate 22 is formed in a rectangular shape in the XY plane view, and is made of acrylic resin, for example. Of the four edges of the light guide plate 22, the lower edge 22a and an upper edge 22b each extend in the left-right direction (the X-axis direction), and a left edge 22c and a right edge 22d each extend in the up-down direction (the Y-axis direction). As shown in FIG. 3, the light guide plate 22 has a first main surface 34, a second main surface 36 opposite the first main surface 34, and a side surface 38 connecting the first main surface 34 and the second main surface 36.

The first main surface 34 of the light guide plate 22 is disposed opposite to the back surface 6b of the display panel 6. The second main surface 36 of the light guide plate 22 is disposed opposite to the base portion 14 of the rear frame 12. As shown in FIG. 4, a plurality of dot patterns 39 (e.g., light diffusing portions) are discretely formed on the second main surface 36 of the light guide plate 22 to diffuse light.

The side surface 38 of the light guide plate 22 includes the light-incident-side side surface 38a, an opposite side surface 38b, a left side surface 38c and a right side surface 38d. The light-incident-side side surface 38a is disposed along the lower edge 22a of the light guide plate 22. The light-incident-side side surface 38a is disposed on a light incident side of the light guide plate 22 where the light from the plurality of LEDs 32 of the LED bar 20 is directly incident. The opposite side surface 38b is disposed on a side opposite the light incident side of the light guide plate 22 along the upper edge 22b of the light guide plate 22. Thus, the opposite side surface 38b is disposed opposite the light-incident-side side surface 38a. The left side surface 38c is disposed along the left edge 22c of the light guide plate 22. The right side surface 38d is disposed along the right edge 22c of the light guide plate 22. The light-incident-side side surface 38a is disposed in or defines a first region of the side surface 38 of the light guide plate 22, while the opposite side surface 38b, the left side surface 38c and the right side surface 38d are disposed in or defines a second region of the side surface 38 of the light guide plate 22 that is different from and a remainder of the first region of the side surface 38 of the light guide plate 22. The light-incident-side side surface 38a is disposed opposite to the plurality of LEDs 32 of the LED bar 20. Thus, in the illustrated embodiment, the first region of the side surface 38 of the light guide plate 22 is a region on which the light from the plurality of LEDs 32 of the LED bar 20 is directly incident from outside of the light guide plate 22, while the second region of the side surface 38 of the light guide plate 22 is a region on which the light from the plurality of LEDs 32 of the LED bar 20 is not directly incident from outside of the light guide plate 22.

As shown in FIG. 4, in the illustrated embodiment, the side surface 38 of the light guide plate 22 includes a first inclined surface 40 in the second region of the side surface 38 of the light guide plate 22. Also, in the illustrated embodiment, the side surface 38 of the light guide plate 22 includes a second inclined surface 42 in the second region of the side surface 38 of the light guide plate 22. Specifically, in the illustrated embodiment, the first inclined surface 40 and the second inclined surface 42 are formed on the opposite side surface 38b of the light guide plate 22. As a result, the cross-sectional shape of the opposite side surface 38b of the light guide plate 22 has an isosceles triangle shape (inverted V-shape), as shown in FIG. 4. The first inclined surface 40 and the second inclined surface 42 are formed along the longitudinal direction (the X-axis direction) of the opposite side surface 38b of the light guide plate 22. The first inclined surface 40 laterally extends (to the left in FIG. 4) from an outer edge of the first main surface 34 of the light guide plate 22 in an inclined manner. Specifically, the first inclined surface 40 outwardly and rearwardly extends from the outer edge of the first main surface 34 in an inclined manner. The inclination angle θ1 of the first inclined surface 40 relative to the first main surface 34 is preferably between 52° and 83°, and more preferably between 62° and 83°. The second inclined surface 42 laterally extends from an outer edge of the second main surface 36 in an inclined manner and connects the second main surface 36 with the first inclined surface 40. Specifically, the second inclined surface 42 outwardly and forwardly extends from the outer edge of the second main surface 36 in an inclined manner. The inclination angle θ2 of the second inclined surface 42 relative to the second main surface 36 is preferably between 52° and 83°, and more preferably between 62° and 83°. In the illustrated embodiment, the inclination angles θ1 and θ2 are equal to each other. However, the inclination angles θ1 and θ2 can be different from each other as needed and/or desired.

Furthermore, as shown in FIGS. 3 and 4, the first inclined surface 40 and the second inclined surface 42 are connected to each other to form an edge that extends parallel to the outer edge of the first main surface 34 or the outer edge of the second main surface 36. Specifically, in the illustrated embodiment, the edge formed between the first inclined surface 40 and the second inclined surface 42 has a linear edge portion that extends along the outer edge of the first main surface 34 or the outer edge of the second main surface 36. In particular, in the illustrated embodiment, the edge formed between the first inclined surface 40 and the second inclined surface 42 linearly extends along the X-axis direction, and linearly extends along an entire width of the light guide plate 22.

Although not shown in the drawings, the left side surface 38c and the right side surface 38d of the light guide plate 22 each also have the similar configuration as shown in FIGS. 3 and 4. Specifically, the left side surface 38c and the right side surface 38d of the light guide plate 22 each also have the first inclined surface 40 and the second inclined surface 42, similar to the opposite side surface 38b. As a result, the cross-sectional shape of each of the left side surface 38c and the right side surface 38d of the light guide plate 22 taken by a horizontal plane parallel to a ZX plane has an isosceles triangle shape (inverted V-shape). Thus, in the illustrated embodiment, the edges formed between the first inclined surfaces 40 and the second inclined surfaces 42 of the opposite side surface 38b, the left side surface 38c and the right side surface 38d of the light guide plate 22 extend along an entirety of the second region of the side surface 38 of the light guide plate 22. The first inclined surface 40 and the second inclined surface 42 are not formed on the light-incident-side side surface 38a of the light guide plate 22. The light-incident-side side surface 38a extends perpendicular to each of the first main surface 34 and the second main surface 36 from an outer edge of the first main surface 34 of the light guide plate 22 to an outer edge of the second main surface 36. In the illustrated embodiment, the first main surface 34 and the second main surface 36 has the same area and the same overall shape, and are arranged with respect to each other such that the outer edges of the first main surface 34 and the second main surface 36 are aligned with respect to each other, respectively, as viewed in the Z-axis direction.

The optical sheet 24 is arranged to cover the first main surface 34 of the light guide plate 22. Although not shown in the drawings, the optical sheet 24 is formed, for example, by mutually superimposing a diffusion sheet and a prism sheet relative to each other. The diffusion sheet is disposed on the light guide plate 22 side, and the prism sheet is disposed on the display panel 6 side. The diffusion sheet has the function of diffusing the light emitted from the first main surface 34 of the light guide plate 22. The prism sheet has the function of guiding the light diffused by the diffusion sheet to the back surface 6b of the display panel 6. In addition to the diffusion sheet and the prism sheet described above, the optical sheet 24 can include a reflective polarizing sheet for polarizing the light emitted from the prism sheet, such as DBEF (registered trademark) (Dual Brightness Enhancement Films) manufactured by Sumitomo 3M Limited (3M Japan Limited).

As shown in FIGS. 2 and 3, the mold frame 26 is formed as a rectangular frame in the XY plane view and is attached to the side wall 16 of the rear frame 12. The mold frame 26 is used to support the outer periphery of the display panel 6 from the back surface 6b side and to hold the outer periphery of the optical sheet 24 against the first main surface 34 of the light guide plate 22. As shown in FIG. 4, the distance D from the outer edge of the first main surface 34 of the light guide plate 22 to an end portion of the mold frame 26 disposed on the optical sheet 24 is preferably between 0.5 mm and 5.0 mm. If the distance D is shorter than 0.5 mm, then the outer periphery of the optical sheet 24 cannot be securely held against the first main surface 34 of the light guide plate 22. If the distance D is longer than 5.0 mm, then an opposite end portion 44 of the first main surface 34 of the light guide plate 22 that is disposed on a side opposite the light incident side of the first main surface 34 of the light guide plate 22 is covered by the end portion of the mold frame 26. This hinders the effect of increasing the luminance at the opposite end portion 44 opposite the light incident side as described below.

The reflective sheet 28 is arranged to cover the second main surface 36 of the light guide plate 22. The reflective sheet 28 has the function of reflecting the light incident on the light-incident-side side surface 38a of the light guide plate 22 toward the first main surface 34. In the illustrated embodiment, as shown in FIGS. 3 and 4, the reflective sheet 28 has an outer edge that extends along the outer edge of the second main surface 36 of the light guide plate 22 from which the second inclined surface 42 extends. In particular, the outer edge of the reflective sheet 28 is arranged to be aligned to the outer edge of the second main surface 36 of the light guide plate 22 as viewed in the Z-axis direction. Thus, in the illustrated embodiment, the reflective sheet 28 is arranged relative to the light guide plate 22 not to overlap with the first inclined surface 40 or the second inclined surface 42 as viewed in the Y-axis direction.

1-2. Operation of Image Display Device

Next, referring to FIG. 3, the operation of the image display device 2 according to the first embodiment will be described.

As shown in FIG. 3, the light from each of the plurality of LEDs 32 is incident on the light-incident-side side surface 38a of the light guide plate 22. The light incident on the light-incident-side side surface 38a of the light guide plate 22 propagates inside the light guide plate 22 while being reflected many times by the optical sheet 24 and/or the reflective sheet 28, and exits from the first main surface 34 of the light guide plate 22.

The light that have exited from the first main surface 34 of the light guide plate 22 is incident on the back surface 6*b* of the display panel 6 after passing through the optical sheet 24. When the light is irradiated on the back surface 6*b* of the display panel 6, an image is displayed on the front surface 6*a* of the display panel 6.

1-3. Effect

Next, referring to FIG. 4, the effects obtained by this embodiment will be described. As shown in FIG. 4, of the light propagating inside the light guide plate 22, the light that reaches the opposite side surface 38*b* is reflected by the first inclined surface 40 or the second inclined surface 42 of the opposite side surface 38*b*. As described above, since each of the inclination angle $\theta 1$ of the first inclined surface 40 relative to the first main surface 34 and the inclination angle $\theta 2$ of the second inclined surface 42 relative to the second main surface 36 is between 52° and 83°, most of the light reflected by the first inclined surface 40 or the second inclined surface 42 can exit from the opposite end portion 44 of the first main surface 34 of the light guide plate 22. The opposite end portion 44 is the end portion of the first main surface 34 of the light guide plate 22 on the side closer to the opposite side surface 38*b*, as shown in FIG. 2.

Specifically, as shown by an arrow P1 in FIG. 4, the light reflected by the first inclined surface 40 is reflected by the second inclined surface 42 and then is reflected by the reflective sheet 28. At this time, the light reflected by the reflective sheet 28 is diffused by the plurality of dot patterns 39 formed on the second main surface 36 of the light guide plate 22, and is incident on the opposite end portion 44 of the first main surface 34 of the light guide plate 22 at an incident angle smaller than the critical angle.

As also shown by an arrow P2 in FIG. 4, the light reflected by the second inclined surface 42 is incident on the opposite end portion 44 of the first main surface 34 of the light guide plate 22 at an incident angle smaller than the critical angle after being reflected by the first inclined surface 40.

As a result, most of the light reflected by the first inclined surface 40 or the second inclined surface 42 of the opposite side surface 38*b* can be incident on the opposite end portion 44 of the first main surface 34 of the light guide plate 22. As a result, the luminance at the opposite end portion 44 of the first main surface 34 of the light guide plate 22 can be increased without being affected by variations in the mounting accuracy of a reflective member described in the background information, and uneven luminance on the first main surface 34 of the light guide plate 22 or the display panel 6 can be suppressed.

Similarly, of the light propagating inside the light guide plate 22, the light that reaches the left side surface 38*c* of the light guide plate 22 is reflected by the first inclined surface 40 or the second inclined surface 42 of the left side surface 38*c*. Also, of the light propagating inside the light guide plate 22, the light that reaches the right side surface 38*d* of the light guide plate 22 is reflected by the first inclined surface 40 or the second inclined surface 42 of the right side surface 38*d*.

With this configuration, as similarly described above, most of the light reflected by the first inclined surface 40 or the second inclined surface 42 of the left side surface 38*c* will be incident on the first main surface 34 of the light guide plate 22 in the vicinity of the left side surface 38*c*. Also, most of the light reflected by the first inclined surface 40 or the second inclined surface 42 of the right side surface 38*d* will be incident on the first main surface 34 of the light guide plate 22 in the vicinity of the right side surface 38*d*. This also suppresses uneven luminance on the display panel 6.

Figure 5:
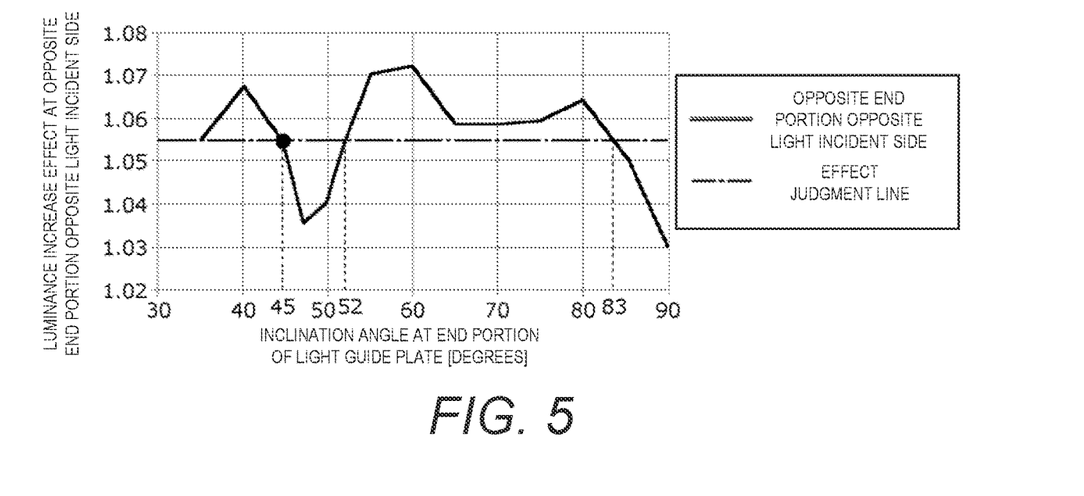
FIG. 5 is a graph showing simulation results of luminance increase effect at an opposite end portion opposite a light incident side of a light guide plate of the image display device according to a first example.
Figure 6:
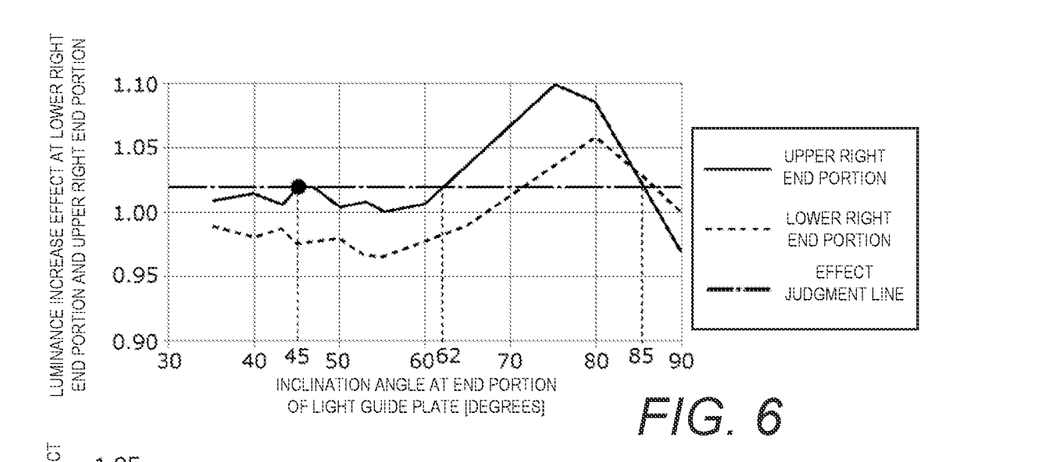
FIG. 6 is a graph showing simulation results of luminance increase effect at a lower right end portion and an upper right end portion of the light guide plate of the image display device according to a second example.
Figure 7:
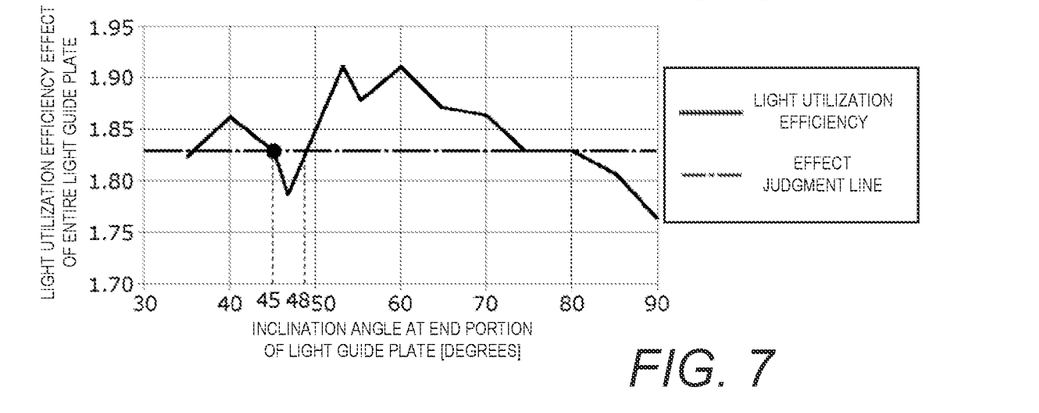
FIG. 7 is a graph showing simulation results of light utilization efficiency effect of the entire light guide plate of the image display device according to a third example.

In order to confirm the effects described above, the following experiments are conducted. FIG. 5 is a graph showing simulation results of luminance increase effect at an opposite end portion 44 of the light guide plate 22 of the image display device 2 according to a first example. FIG. 6 is a graph showing simulation results of luminance increase effect at a lower right end portion 46 and an upper right end portion 48 of the light guide plate 22 of the image display device 2 according to a second example. FIG. 7 is a graph showing simulation results of light utilization efficiency effect of the entire light guide plate 22 of the image display device 2 according to a third example.

As the first example, the distance D from the outer edge of the first main surface 34 of the light guide plate 22 to the end portion of the mold frame 26 is set between 0.5 mm and 5.0 mm, as in the image display device 2 of this embodiment, and simulations about the luminance increase effect at the opposite end portion 44 of the first main surface 34 of the light guide plate 22 are conducted while the inclination angles $\theta 1$ and $\theta 2$ of the first inclined surface 40 and the second inclined surface 42 of the light guide plate 22 (i.e., the end portion of the light guide plate 22) are each varied. As the luminance increase effect, the luminance at the time when the inclination angles $\theta 1$ and $\theta 2$ are both 45° is used as the effect judgment line or reference, and the inclination angles $\theta 1$ and $\theta 2$ with the luminance that exceeds this effect judgment line are evaluated.

As shown in the simulation results in FIG. 5, it is found that the luminance at the opposite end portion 44 of the first main surface 34 of the light guide plate 22 exceeds the effect judgment line when the inclination angles $\theta 1$ and $\theta 2$ are both between 52° and 83°.

As the second example, the distance D from the outer edge of the first main surface 34 of the light guide plate 22 to the end portion of the mold frame 26 is set to between 0.5 mm and 5.0 mm, as in the image display device 2 of this embodiment, and simulations about the luminance increase effect at the lower right end portion 46 and the upper right end portion 48 (see FIG. 2) of the first main surface 34 of the light guide plate 22 are conducted while the inclination angles $\theta 1$ and $\theta 2$ of the first inclined surface 40 and the second inclined surface 42 of the light guide plate 22 are each varied. As the luminance increase effect, the luminance at the time when the inclination angles $\theta 1$ and $\theta 2$ are both 45° is used as the effect judgment line or reference, and the inclination angles $\theta 1$ and $\theta 2$ with the luminance that exceeds this effect judgment line are evaluated. The lower right end portion 46 and the upper right end portion 48 are the end portions of the first main surface 34 of the light guide plate 22 on the side closer to the right side surface 38*d*, as shown in FIG. 2. The lower right end portion 46 is the end portion on the side closer to the lower edge 22*a* of the light guide plate 22, and the upper right end portion 48 is the end portion on the side closer to the upper edge 22*b* of the light guide plate 22.

As shown in the simulation results in FIG. 6, it is found that the luminance at the upper right end portion 48 of the first main surface 34 of the light guide plate 22 exceeds the effect judgment line when the inclination angles $\theta 1$ and $\theta 2$ are both between 62° and 85°. Therefore, if the simulation results of the first example are also taken into account, when the inclination angles $\theta 1$ and $\theta 2$ are both between 62° and 83°, not only the luminance at the opposite end portion 44 of the first main surface 34 of the light guide plate 22 exceeds the effect judgment line, but also the luminance at the upper right end portion 48 exceeds the effect judgment line.

As the third example, the distance D from the outer edge of the first main surface 34 of the light guide plate 22 to the end portion of the mold frame 26 is set between 0.5 mm and 5.0 mm, as in the image display device 2 of this embodiment, and simulations about the light utilization efficiency effect of the entire light guide plate 22 are conducted while the inclination angles θ1 and θ2 of the first inclined surface 40 and the second inclined surface 42 of the light guide plate 22 are each varied. As the light utilization efficiency effect, the light utilization efficiency at the time when the inclination angles θ1 and θ2 are both 45° is used as the effect judgment line or reference, and the inclination angles θ1 and θ2 with the light utilization efficiency that exceeds this effect judgment line are evaluated.

As shown in the simulation results in FIG. 7, the light utilization efficiency of the entire light guide plate 22 exceeds the effect judgment line when the inclination angles θ1 and θ2 are both between 48° and 80°.

Second Embodiment

Figure 8:
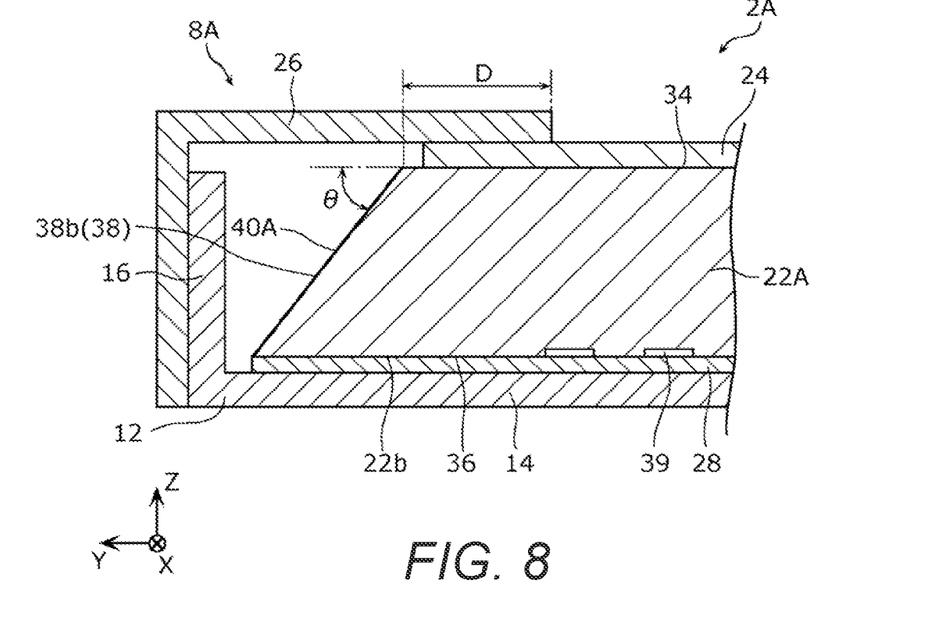
FIG. 8 is an enlarged cross-sectional view of an image display device according to a second embodiment.

Next, referring to FIG. 8, the configuration of an image display device 2A according to a second embodiment will be described. FIG. 8 is an enlarged cross-sectional view of the image display device 2A according to the second embodiment. For convenience of explanation, the display panel 6 and the front cabinet 10 are omitted in FIG. 8. In each of the following embodiments, the same reference numerals are given to the same components as in the first embodiment above, and the explanation will be omitted for the sake of brevity. Also, the descriptions of the components of the second embodiment that differ from the corresponding components of the first embodiment will be indicated with the same numerals followed by "A" and the differences thereof will be explained.

As shown in FIG. 8, in the image display device 2A according to the second embodiment, the configuration of a light guide plate 22A of a backlight 8A is different from that of the first embodiment above. Specifically, only a first inclined surface 40A is formed on the opposite side surface 38b opposite the light incident side of the light guide plate 22A. As a result, the cross-sectional shape of the opposite side surface 38b of the light guide plate 22A has a right triangular shape.

The first inclined surface 40A is formed along the longitudinal direction (the X-axis direction) of the opposite side surface 38b of the light guide plate 22A. The first inclined surface 40A laterally extends from the outer edge of the first main surface 34 of the light guide plate 22A in an inclined manner and connects the first main surface 34 with the second main surface 36. Specifically, as shown in FIG. 8, the first inclined surface 40A extends from the outer edge of the first main surface 34 to the outer edge of the second main surface 36. The inclination angle θ of the first inclined surface 40A relative to the first main surface 34 is preferably between 52° and 83°, and more preferably between 62° and 83°.

Although not shown in the drawings, the left side surface 38c and the right side surface 38d of the light guide plate 22 each also have the similar configuration as shown in FIG. 8. Specifically, only the first inclined surface 40A is formed on the left side surface 38c and the right side surface 38d (see FIG. 2) of the light guide plate 22A, similar to the opposite side surface 38b. In the illustrated embodiment, the first main surface 34 has a smaller area than the second main surface 36. Thus, the outer edges of the first main surface 34 are inwardly offset with respect to the outer edges of the second main surface 36 as viewed in the Z-axis direction.

Therefore, the same effect as in the first embodiment above can be obtained in this embodiment. In particular, when the thickness (size in the Z-axis direction) of the light guide plate 22A is relatively thin, the area of the first inclined surface 40A can be sufficiently secured.

Third Embodiment

Figure 9:
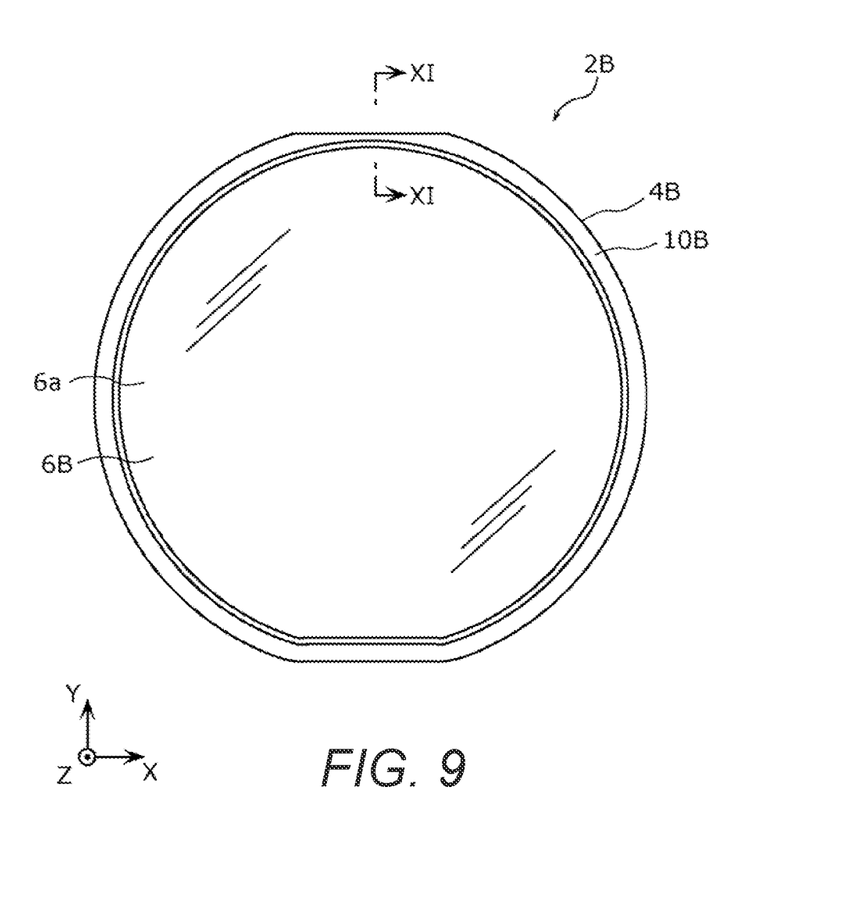
FIG. 9 is a front elevational view of an image display device according to a third embodiment.
Figure 10:
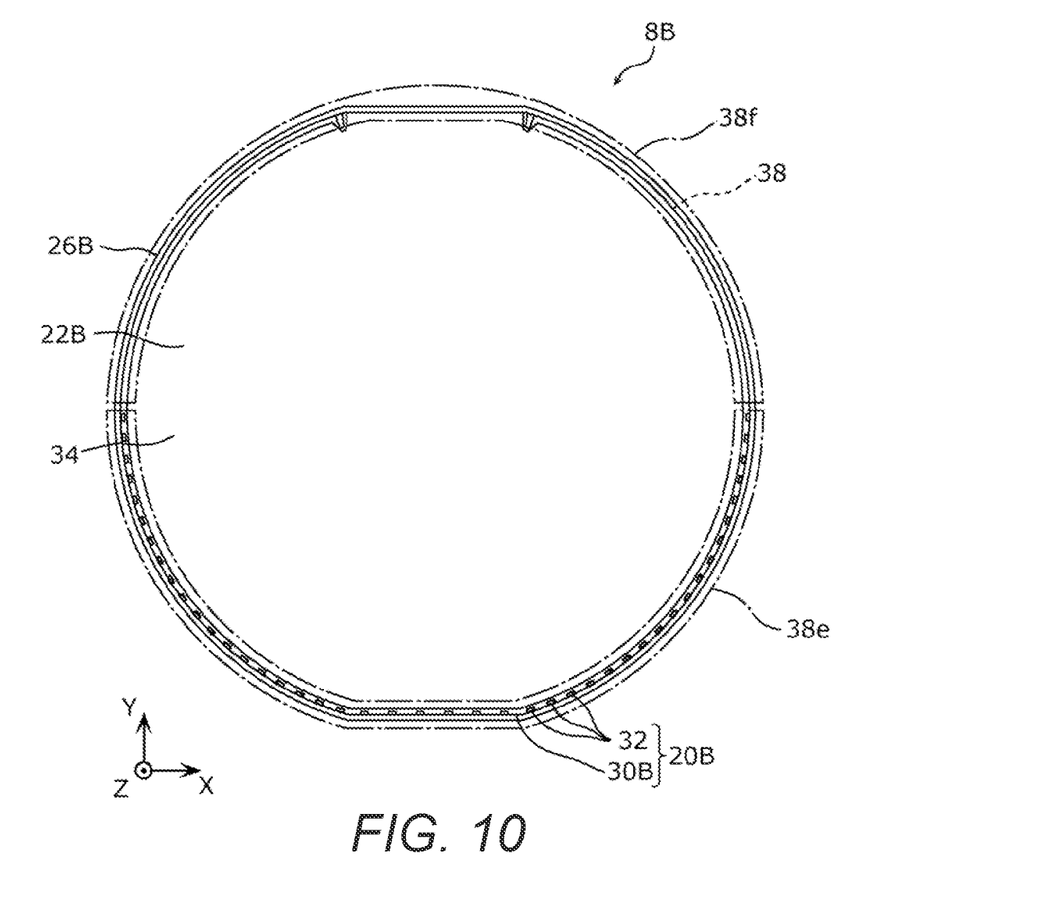
FIG. 10 is a front elevational view of a backlight of the image display device according to the third embodiment.
Figure 11:
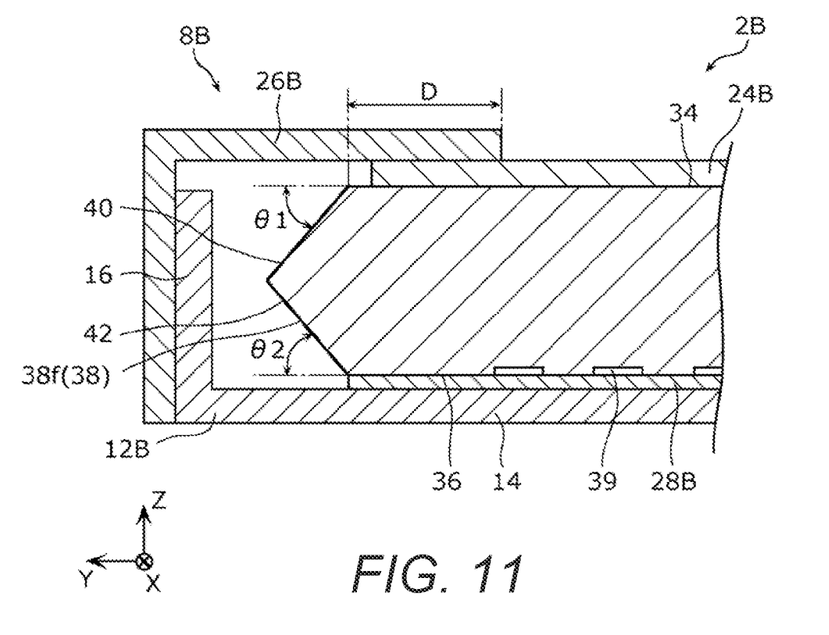
FIG. 11 is an enlarged cross-sectional view of the image display device according to the third embodiment, taken along XI-XI line of FIG. 9.

Next, referring to FIGS. 9 to 11, the configuration of an image display device 2B according to a third embodiment will be described. FIG. 9 is a front elevational view of the image display device 2B according to the third embodiment. FIG. 10 is a front elevational view of a backlight 8B of the image display device 2B according to the third embodiment. FIG. 11 is an enlarged cross-sectional view of the image display device 2B according to the third embodiment, taken along XI-XI line of FIG. 9. For convenience of explanation, a display panel 6B and a front cabinet 10B are omitted in FIG. 11. In the illustrated embodiment, the descriptions of the components of the third embodiment that differ from the corresponding components of the first embodiment will be indicated with the same numerals followed by "B" and the differences thereof will be explained.

As shown in FIG. 9, the image display device 2B according to the third embodiment differs from the first embodiment above in that the overall shape of the device is circular in the XY plane view.

As shown in FIG. 9, a front cabinet 10B of a housing 4B is formed in the shape of a circular ring frame in the XY plane view. A rear frame 12B of the housing 4B is formed as a thin plate with a circular ring shape in the XY plane view. As shown in FIG. 9, the display panel 6B is formed in a circular shape in the XY plane view.

As shown in FIG. 10, a wiring substrate 30B of a LED bar 20B of the backlight 8B is configured as a long plate curved in a semicircular ring shape. Each of a plurality of LEDs 32 of the LED bar 20B emits light toward a light-incident-side side surface 38e (described later) of a light guide plate 22B.

As shown in FIG. 10, the light guide plate 22B is formed in a circular shape in the XY plane view. A side surface 38 of the light guide plate 22B has the light-incident-side side surface 38e and an opposite side surface 38f. The light-incident-side side surface 38e is disposed on a light incident side of the light guide plate 22 where the light from the plurality of LEDs 32 of the LED bar 20B is directly incident. In the illustrated embodiment, the light-incident-side side surface 38e is disposed along a lower periphery of the light guide plate 22B. The opposite side surface 38f is disposed on a side opposite the light incident side of the light guide plate 22B along an upper periphery of the light guide plate 22B. Thus, the opposite side surface 38f is disposed opposite the light-incident-side side surface 38e. The light-incident-side side surface 38e is disposed in or defines a first region of the side surface 38 of the light guide plate 22B, while the opposite side surface 38f is disposed in or defines a second region of the side surface 38 of the light guide plate 22B that is different from and a remainder of the first region of the side surface 38 of the light guide plate 22B. The light-incident-side side surface 38e is disposed opposite to the plurality of LEDs 32 of the LED bar 20B. Thus, in the illustrated embodiment, the first region of the side surface 38 of the light guide plate 22B is a region on which the light from the plurality of LEDs 32 of the LED bar 20B is directly incident, while the second region of the side surface 38 of the light guide plate 22B is a region on which the light from the plurality of LEDs 32 of the LED bar 20B is not directly incident.

As shown in FIG. 11, in the illustrated embodiment, the side surface 38 of the light guide plate 22B includes a first inclined surface 40 in the second region of the side surface 38 of the light guide plate 22B. Also, in the illustrated embodiment, the side surface 38 of the light guide plate 22B includes a second inclined surface 42 in the second region of the side surface 38 of the light guide plate 22B. Specifically, in the illustrated embodiment, the first inclined surface 40 and the second inclined surface 42 are formed on the opposite side surface 38f of the light guide plate 22B. The configurations (e.g., inclination angles θ1 and θ2) of the first inclined surface 40 and the second inclined surface 42 are the same as those of the first embodiment above, and thus the explanation will be omitted for the sake of brevity.

In the illustrated embodiment, as shown in FIG. 11, the first inclined surface 40 and the second inclined surface 42 are connected to each other to form an edge that extends parallel to the outer edge of the first main surface 34 from which the first inclined surface 40 extends or the outer edge of the second main surface 36 from which the second inclined surface 42. Specifically, in the illustrated embodiment, the edge formed between the first inclined surface 40 and the second inclined surface 42 has a curved edge portion that extends along the outer edge of the first main surface 34 or the outer edge of the second main surface 36. In particular, in the illustrated embodiment, the edge formed between the first inclined surface 40 and the second inclined surface 42 extends along an entirety of the second region of the side surface 38 of the light guide plate 22B.

Furthermore, in the illustrated embodiment, the backlight 8B of the image display device 2B also includes an optical sheet 24B, a mold frame 26B and a reflective sheet 28B. Each of the optical sheet 24B and the reflective sheet 28B of the backlight 8B is formed in a circular shape in the XY plane view, corresponding to the shape of the light guide plate 22B. The mold frame 26B of the backlight 8B is formed in a circular ring shape in the XY plane view, corresponding to the shape of the light guide plate 22B.

Therefore, the same effect as in the first embodiment above can be obtained in this embodiment.

MODIFICATION EXAMPLES

The image display devices according to the first to third embodiments have been explained above, but the invention is not limited to the first to third embodiments. For example, each of the first to third embodiments can be combined with each other as needed and/or desired.

In each of the first to third embodiments, the case where the image display device 2 (2A, 2B) is a liquid crystal display television receiver has been explained, but the invention is not limited to this. The image display device 2 (2A, 2B) can be, for example, a liquid crystal display for a personal computer.

In the second embodiment above, only the first inclined surface 40A is formed on the opposite side surface 38b of the light guide plate 22A, but instead of this configuration, only a second inclined surface can be formed. In this case, the second inclined surface laterally extends from an outer edge of the second main surface 36 of the light guide plate 22A in an inclined manner, and connects the first main surface 34 with the second main surface 36. The inclination angle of the second inclined surface relative to the second main surface 36 is preferably between 52° and 83°, and more preferably between 62° and 83°. The second inclined surface can also be formed on the left side surface 38c and the right side surface 38d of the light guide plate 22A in the same way as the opposite side surface 38b.

The image display device can be applied, for example, as a liquid crystal display television receiver.

(1) In view of the state of the known technology and in accordance with a first aspect of the present invention, a backlight comprises a light guide plate and a light emitting element. The light guide plate has a first main surface, a second main surface opposite the first main surface, and a side surface connecting the first main surface and the second main surface, the side surface having a first region and a second region different from the first region. The light emitting element is configured to emit light toward the first region of the side surface of the light guide plate. The side surface of the light guide plate includes, in the second region of the side surface of the light guide plate, a first inclined surface that extends from an outer edge of the first main surface in an inclined manner and has an inclination angle between 52° and 83° with respect to the first main surface.

With this backlight, in the second region of the light guide plate, the first inclined surface is formed that extends from the outer edge of the first main surface in the inclined manner and has the inclination angle between 52° and 83° with respect to the first main surface. With this configuration, most of the light reflected by the first inclined surface out of the light propagating inside the light guide plate can enter an end portion of the first main surface of the light guide plate (an end portion on a side closer to the second region of the side surface of the light guide plate). As a result, the luminance at the end portion of the first main surface of the light guide plate can be increased without being affected by variations in the mounting accuracy of a reflective member as described in the background information, and uneven luminance on the first main surface of the light guide plate can be suppressed.

(2) In accordance with a preferred embodiment according to the backlight mentioned above, the inclination angle of the first inclined surface is between 62° and 83° with respect to the first main surface.

(3) In accordance with a preferred embodiment according to any one of the backlights mentioned above, the side surface of the light guide plate further includes, in the second region of the side surface of the light guide plate, a second inclined surface that extends from an outer edge of the second main surface in an inclined manner to connect the second main surface and the first inclined surface and has an inclination angle between 52° and 83° with respect to the second main surface.

With this backlight, since the second inclined surface is formed in the second region of the side surface of the light guide plate in addition to the first inclined surface, most of the light reflected by the first inclined surface and/or the second inclined surface out of the light propagating inside the light guide plate can enter the end portion of the first main surface of the light guide plate. As a result, the luminance at the end portion of the first main surface of the light guide plate can be increased more effectively, and uneven luminance on the first main surface of the light guide plate can be suppressed more effectively.

(4) In accordance with a preferred embodiment according to any one of the backlights mentioned above, the inclination angle of the second inclined surface is between 62° and 83° with respect to the second main surface.

(5) In accordance with a preferred embodiment according to any one of the backlights mentioned above, the inclination angle of the first inclined surface and the inclination angle of the second inclined surface are equal to each other.

(6) In accordance with a preferred embodiment according to any one of the backlights mentioned above, the first inclined surface and the second inclined surface are connected to each other to form an edge of the light guide plate that extends parallel to the outer edge of the first main surface or the outer edge of the second main surface.

(7) In accordance with a preferred embodiment according to any one of the backlights mentioned above, the first inclined surface extends from the outer edge of the first main surface to an outer edge of the second main surface.

(8) In accordance with a preferred embodiment according to any one of the backlights mentioned above, the backlight further comprises an optical sheet and a frame member. The optical sheet is arranged to cover the first main surface of the light guide plate. The frame member holds an outer periphery of the optical sheet against the first main surface of the light guide plate. A distance from the outer edge of the first main surface of the light guide plate to an end portion of the frame member is between 0.5 mm and 5.0 mm.

With this backlight, since the distance from the outer edge of the first main surface of the light guide plate to the end portion of the frame member is between 0.5 mm and 5.0 mm, the outer periphery of the optical sheet can be securely held against the first main surface of the light guide plate, and thus the effect of increasing the luminance at the end portion of the first main surface of the light guide plate cannot be prevented.

(9) In accordance with a preferred embodiment according to any one of the backlights mentioned above, the light guide plate is formed in a rectangular shape, the first region of the side surface of the light guide plate is disposed corresponding to one edge of the light guide plate, and the second region of the side surface of the light guide plate is disposed corresponding to the other three edges of the light guide plate.

With this backlight, the luminance at the end portion of the first main surface of the light guide plate can be effectively increased even when the light guide plate is formed in a rectangular shape.

(10) In accordance with a preferred embodiment according to any one of the backlights mentioned above, the backlight further comprises a reflective sheet arranged to cover the second main surface of the light guide plate.

(11) In accordance with a preferred embodiment according to any one of the backlights mentioned above, the reflective sheet has an outer edge that extends along an outer edge of the second main surface of the light guide plate.

(12) In accordance with a preferred embodiment according to any one of the backlights mentioned above, the second main surface of the light guide plate includes a plurality of light diffusing portions.

(13) In accordance with a preferred embodiment according to any one of the backlights mentioned above, the light emitting element includes a plurality of light emitting diodes that is arranged relative to each other along the first region of the side surface of the light guide plate.

(14) In view of the state of the known technology and in accordance with a second aspect of the present invention, an image display device comprises a display panel configured to display image on a front surface, and any one of the backlights mentioned above.

(15) In accordance with a preferred embodiment according to the image display device mentioned above, the first main surface of the light guide plate of the backlight disposed opposite to a back surface of the display panel.

With any one of the image display devices mentioned above, in the second region of the light guide plate, the first inclined surface is formed that extends from the outer edge of the first main surface in the inclined manner and has the inclination angle between 52° and 83° with respect to the first main surface. With this configuration, most of the light reflected by the first inclined surface out of the light propagating inside the light guide plate can enter an end portion of the first main surface of the light guide plate (an end portion on a side closer to the second region of the side surface of the light guide plate). As a result, the luminance at the end portion of the first main surface of the light guide plate can be increased without being affected by variations in the mounting accuracy of a reflective member as described in the background information, and uneven luminance on the display panel can be suppressed.

Furthermore, with any one of the image display devices mentioned above, the side surface of the light guide plate further includes, in the second region of the side surface of the light guide plate, a second inclined surface that extends from an outer edge of the second main surface in an inclined manner to connect the second main surface and the first inclined surface and has an inclination angle between 52° and 83° with respect to the second main surface.

With this image display device, since the second inclined surface is formed in the second region of the side surface of the light guide plate in addition to the first inclined surface, most of the light reflected by the first inclined surface and/or the second inclined surface out of the light propagating inside the light guide plate can enter the end portion of the first main surface of the light guide plate. As a result, the luminance at the end portion of the first main surface of the light guide plate can be increased more effectively, and uneven luminance on the display panel can be suppressed more effectively.

Furthermore, with any one of the image display devices mentioned above, the image display device further comprises an optical sheet and a frame member. The optical sheet is arranged to cover the first main surface of the light guide plate. The frame member holds an outer periphery of the optical sheet against the first main surface of the light guide plate. A distance from the outer edge of the first main surface of the light guide plate to an end portion of the frame member is between 0.5 mm and 5.0 mm.

With this image display device, since the distance from the outer edge of the first main surface of the light guide plate to the end portion of the frame member is between 0.5 mm and 5.0 mm, the outer periphery of the optical sheet can be securely held against the first main surface of the light guide plate, and thus the effect of increasing the luminance at the end portion of the first main surface of the light guide plate cannot be prevented.

Furthermore, with any one of the image display devices mentioned above, the light guide plate is formed in a rectangular shape, the first region of the side surface of the light guide plate is disposed corresponding to one edge of the light guide plate, and the second region of the side surface of the light guide plate is disposed corresponding to the other three edges of the light guide plate.

With this image display device, the luminance at the end portion of the first main surface of the light guide plate can be effectively increased even when the light guide plate is formed in a rectangular shape.

(16) In accordance with a preferred embodiment according to any one of the backlights mentioned above, the edge of the light guide plate extends along an entirety of the second region of the side surface of the light guide plate.

(17) In accordance with a preferred embodiment according to any one of the backlights mentioned above, the light guide plate has an overall rectangular shape, and the edge of the light guide plate has a linear edge portion that extends along the outer edge of the first main surface or the outer edge of the second main surface.

(18) In accordance with a preferred embodiment according to any one of the backlights mentioned above, the edge of the light guide plate linearly extends along an entire width of the light guide plate.

(19) In accordance with a preferred embodiment according to any one of the backlights mentioned above, the light guide plate has an overall circular shape, and the edge of the light guide plate has a curved edge portion that extends along the outer edge of the first main surface or the outer edge of the second main surface.

(20) In accordance with a preferred embodiment according to any one of the backlights mentioned above, the inclination angle of the first inclined surface is between 62° and 83°.

With the backlight and the image display device, uneven luminance on the light guide plate or the display panel can be suppressed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a liquid crystal television receiver or a backlight in an upright position. Accordingly, these directional terms, as utilized to describe the liquid crystal television receiver or the backlight should be interpreted relative to a liquid crystal television receiver or a backlight in an upright position on a horizontal surface. The terms "left" and "right" are used to indicate the "right" when referencing from the right side as viewed from the front of the liquid crystal television receiver or the backlight, and the "left" when referencing from the left side as viewed from the front of the liquid crystal television receiver or the backlight.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A backlight comprising:
   a light guide plate having a first main surface, a second main surface opposite the first main surface, and a side surface connecting the first main surface and the second main surface, the side surface having a first region and a second region different from the first region; and
   a light emitting element that emits light toward the first region of the side surface of the light guide plate,
   the side surface of the light guide plate including, in the second region of the side surface of the light guide plate, a first inclined surface that extends from an outer edge of the first main surface in an inclined manner and has an inclination angle between 52° and 70° with respect to the first main surface such that there is an increased light utilization efficiency effect of the light guide plate,
   the light guide plate being formed in a rectangular shape,
   the first region of the side surface of the light guide plate being disposed corresponding to one edge of the light guide plate, and
   the second region of the side surface of the light guide plate being disposed corresponding to the other three edges of the light guide plate.

2. A backlight comprising:
   a light guide plate having a first main surface, a second main surface opposite the first main surface, and a side surface connecting the first main surface and the second main surface, the side surface having a first region and a second region different from the first region; and
   a light emitting element that emits light toward the first region of the side surface of the light guide plate,
   the side surface of the light guide plate including, in the second region of the side surface of the light guide plate, a first inclined surface that extends from an outer edge of the first main surface in an inclined manner and has an inclination angle between 62° and 83° with respect to the first main surface such that there is an increased luminance effect at an end portion, the light guide plate being formed in a rectangular shape, the first region of the side surface of the light guide plate being disposed corresponding to one edge of the light guide plate, the second region of the side surface of the light guide plate being disposed corresponding to the other three edges of the light guide plate.

3. The backlight according to claim 1, wherein the side surface of the light guide plate further includes, in the second region of the side surface of the light guide plate, a second inclined surface that extends from an outer edge of the second main surface in an inclined manner to connect the second main surface and the first inclined surface and has an inclination angle between 52° and 83° with respect to the second main surface.

4. The backlight according to claim 3, wherein the inclination angle of the second inclined surface is between 62° and 83° with respect to the second main surface.

5. The backlight according to claim 3, wherein the inclination angle of the first inclined surface and the inclination angle of the second inclined surface are equal to each other.

6. The backlight according to claim 3, wherein the first inclined surface and the second inclined surface are connected to each other to form an edge of the light guide plate that extends parallel to the outer edge of the first main surface or the outer edge of the second main surface.

7. The backlight according to claim 1, wherein the first inclined surface extends from the outer edge of the first main surface to an outer edge of the second main surface.

8. The backlight according to claim 1, further comprising an optical sheet arranged to cover the first main surface of the light guide plate, and a frame member holding an outer periphery of the optical sheet against the first main surface of the light guide plate, wherein a distance from the outer edge of the first main surface of the light guide plate to an end portion of the frame member is between 0.5 mm to 5.0 mm.

9. The backlight according to claim 1, further comprising a reflective sheet arranged to cover the second main surface of the light guide plate.

10. The backlight according to claim 9, wherein the reflective sheet has an outer edge that extends along an outer edge of the second main surface of the light guide plate.

11. The backlight according to claim 1, wherein the second main surface of the light guide plate includes a plurality of light diffusing portions.

12. The backlight according to claim 1, wherein the light emitting element includes a plurality of light emitting diodes that is arranged relative to each other along the first region of the side surface of the light guide plate.

13. An image display device comprising:

a display panel configured to display image on a front surface; and the backlight according to claim 1.

14. The image display device according to claim 13, wherein the first main surface of the light guide plate of the backlight is disposed facing a back surface of the display panel.

15. The backlight according to claim 6, wherein the edge of the light guide plate extends along an entirety of the second region of the side surface of the light guide plate.

16. The backlight according to claim 6, wherein the light guide plate has an overall rectangular shape, and the edge of the light guide plate has a linear edge portion that extends along the outer edge of the first main surface or the outer edge of the second main surface.

17. The backlight according to claim 16, wherein the edge of the light guide plate linearly extends along an entire width of the light guide plate.

18. The backlight according to claim 6, wherein the light guide plate has an overall circular shape, and the edge of the light guide plate has a curved edge portion that extends along the outer edge of the first main surface or the outer edge of the second main surface.

19. The backlight according to claim 11, wherein the light diffusing portions include a plurality of dot patterns to diffuse light.

* * * * *